United States Patent
Wang et al.

(10) Patent No.: US 11,248,087 B2
(45) Date of Patent: Feb. 15, 2022

(54) CATIONIC DYEABLE POLYESTER FIBER AND PREPARING METHOD THEREOF

(71) Applicant: JIANGSU HENGLI CHEMICAL FIBRE CO., LTD., Wujiang (CN)

(72) Inventors: Lili Wang, Wujiang (CN); Xiaoyu Wang, Wujiang (CN); Fangming Tang, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 17/277,302

(22) PCT Filed: Oct. 29, 2019

(86) PCT No.: PCT/CN2019/113845
§ 371 (c)(1),
(2) Date: Mar. 18, 2021

(87) PCT Pub. No.: WO2020/134496
PCT Pub. Date: Jul. 2, 2020

(65) Prior Publication Data
US 2021/0309799 A1    Oct. 7, 2021

(30) Foreign Application Priority Data
Dec. 27, 2018   (CN) .......................... 201811614034.4

(51) Int. Cl.
C08G 63/688    (2006.01)
D01F 6/84      (2006.01)

(52) U.S. Cl.
CPC .......... *C08G 63/6886* (2013.01); *D01F 6/84* (2013.01); *D10B 2401/14* (2013.01)

(58) Field of Classification Search
CPC .... C08G 63/6886; D10B 2401/14; D01F 6/84
See application file for complete search history.

(56) References Cited

U.S. PATENT DOCUMENTS

| | | | | |
|---|---|---|---|---|
| 3,959,213 A * | 5/1976 | Gilkey | ............... | C08G 63/6884 524/119 |
| 5,456,960 A * | 10/1995 | Ido | ................... | D06P 1/65118 428/206 |
| 2006/0047066 A1* | 3/2006 | Oldfield | ................... | A61Q 5/06 524/800 |
| 2007/0208096 A1* | 9/2007 | DeLeon | ............. | C08G 18/4202 521/131 |
| 2011/0217255 A1* | 9/2011 | Kim | .................... | A61P 43/00 424/70.11 |
| 2013/0045912 A1* | 2/2013 | Morschhaeuser | .. | C08G 63/6886 510/400 |
| 2013/0196099 A1* | 8/2013 | Sakamoto | ............... | B32B 27/34 428/35.4 |
| 2013/0323505 A1* | 12/2013 | Nakatsuka | ............... | D02G 3/36 428/373 |
| 2019/0040193 A1* | 2/2019 | Okimoto | .................. | C08L 67/02 |
| 2019/0169361 A1* | 6/2019 | Fan | ............................ | D06P 3/54 |
| 2021/0172094 A1* | 6/2021 | Hamanaka | ............... | D01F 8/06 |
| 2021/0230776 A1* | 7/2021 | Tang | ......................... | D01F 6/92 |

FOREIGN PATENT DOCUMENTS

| | | |
|---|---|---|
| CN | 1749293 A | 3/2006 |
| CN | 101063236 A | 10/2007 |
| CN | 101613466 A | 12/2009 |
| CN | 101671432 A | 3/2010 |
| CN | 102120816 A | 7/2011 |
| CN | 108440747 A | 8/2018 |
| CN | 109680353 A | 4/2019 |
| JP | 2012180504 A | 9/2012 |

OTHER PUBLICATIONS

Machine translation of CN 101613466, 2021 (Year: 2021).*

* cited by examiner

*Primary Examiner* — Liam J Heincer
(74) *Attorney, Agent, or Firm* — Bayramoglu Law Offices LLC

(57) ABSTRACT

A type of cationic dyeable polyester fiber and preparing method thereof are disclosed. The preparing method is to manufacture a fiber from a cationic modified polyester through a fully drawn yarn (FDY) process, wherein the cationic modified polyester is composed of terephthalic acid segments, ethylene glycol segments, sodium salt of diethylene ester of 5-sulfoisophthalic acid segments and tert-butyl branched diol segments and a molecular formula of tert-butyl branched diol is as following:

$$CH_3-\underset{\underset{OH}{|}}{\overset{\overset{CH_3}{|}}{C}}-CH_2-CH_2-\underset{\underset{OH}{|}}{\overset{\overset{R}{|}}{C}}-C(CH_3)_3$$

The cationic modified polyester is further dispersed with a high temperature calcined solid heteropolyacid. A final fiber has a dye uptake of 87.8-92.2% and a K/S value of 23.27-25.67 when dyed at 120° C., as well as an intrinsic viscosity drop of 13-17% when stored at 25° C. and R.H. 65% for 60 months.

17 Claims, No Drawings

CATIONIC DYEABLE POLYESTER FIBER AND PREPARING METHOD THEREOF

CROSS REFERENCE TO THE RELATED APPLICATIONS

This application is the national stage entry of International Application No. PCT/CN2019/113845, filed on Oct. 29, 2019, which is based upon and claims priority to Chinese Patent Application No. 201811614034.4, filed on Dec. 27, 2018, the entire contents of which are incorporated herein by reference.

TECHNICAL FIELD

The present invention belongs to the field of polyester fiber, and more particularly, relates to one type of cationic dyeable polyester fiber and preparing method thereof.

BACKGROUND

Polyester fiber, known as an important role among synthetic fibers, is usually referred to that made of polyethylene terephthalate (PET) through the melt spinning and the after treatment processes, whereas PET is synthesized from terephalic acid (PTA, or dimethyl terephalate, DMT) and ethylene glycol (EG) through the esterification (or transesterification) and the following polycondensation. With the continuous improvement of living standards in modern society, the requirement for the quantity and quality of the fiber material in the field of clothing and decoration To this end, it is necessary to develop the differential fibers with novel performance and added value.

In the PET molecular chains there are no hydrophilic groups or dye site groups just like those existed cellulose or protein fiber, PET fiber, with a hydrophobicity and inertia manner, shows an unsatisfied dyeability. In addition, PET fiber possesses a type of partly crystallized supramolecular structure, specifically, a coexistence state of crystalline regions composed of parallel molecular chains mostly in trans-conformation and amorphous regions composed of molecular chains mostly in cis-conformation, and such tight molecular arrangement increases the dyeing difficulty of PET fiber even more. At present, conventional PET fiber is usually dyed with disperse dyes at high temperature (130° C.) and high pressure to ensure the dye uptake. However, the requirement of specific equipment and high energy consumption originated from the high temperature and high pressure dyeing, together with the long time consumption resulted from the dyeing difficulty mentioned above, the cost of PET fiber dyeing is rather high, which has restricted the application of colored PET fiber to some extent.

In order to overcome this difficulty, the cationic dyeable polyester fiber has been prepared by importing SIPE (sodium salt of diethylene ester of 5-sulfoisophthalic acid) modifier into the polyester molecules, wherein the polar sodium sulfonate group could be connected with cationic dyes. As a matter of fact, at present cationic dyeable polyester has become the first variety of modified polyester. However, in order to obtain the ideal dyeing performance, quite a few monomer SIPE, normally 2-3 mol % of PTA, need to be added into those cationic modified polyesters, resulting in the generation of condensed particles or even the formation of precipitate if they react with metal ions. Meanwhile, much more side reactions will also be stimulated during the synthesis process of polyester, which make the composition of the precipitate complex and difficult to remove. Hence, in general the cationic modified polyester shows poor spinnability, leading to the short spin pack life time and the unstable fiber quality.

Furthermore, with the rapid development of PET industry, although PET will not directly cause harm to the environment, the difficulties in the PBT waste treatment can indirectly increase environmental pressure due to its huge amount and strong resistance to atmospheric and microbial degradation. In present, landfill, incineration and recovery are the main methods to treat PET waste, from the environmental protection point of view, landfill and incineration are easy but dirty. Conversely, chemical degradation, i.e., to recover alcohol, carboxylic acid and ester from the alcoholysis reaction or aminolysis reaction, has been believed as an efficient and scientific treatment for PBT waste. However, the tight structure, the high crystallinity and the long natural degradation time (a period up to 16-48 years) of PET bring much restriction to the realization of chemical degradation recovery.

Therefore, it is of great significance to develop a kind of cationic dyeable polyester fiber with low SIPE loading and rapid natural degradation rate.

SUMMARY

The primary object of the present invention is to provide one kind of cationic dyeable polyester fiber with low SIPE loading as well as rapid natural degradation rate and the preparing method thereof, so as to overcome the relative inadequacies in the existed technology.

To this end, the key technical points of the invention are as follows:

The preparing method of the cationic dyeable polyester fiber, characterized by manufacturing filament from a modified polyester through the fully drawn yarn (FDY) techniques;

wherein said modified polyester is the product of the esterification and the following polycondensation reactions of evenly mixed PTA, EG, SIPE, tert-butyl branched diol and high temperature calcined solid heteropolyacid powder;

wherein said tert-butyl branched diol has a molecular formula as

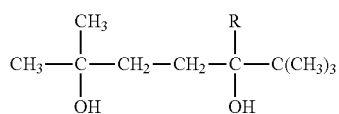

(Formula 1)

with R standing for —H, —CH$_2$CH$_3$, —CH(CH$_3$)$_2$ or —C(CH$_3$)$_3$;

wherein said solid heteropolyacid is more than one of SiO$_2$—TiO$_2$, SiO$_2$—ZrO$_2$, B$_2$O$_3$—Al$_2$O$_3$, TiO$_2$—ZnO and SiO$_2$—CaO, which have been calcined under a high temperature of 400-700° C.

In the present invention the tert-butyl branched diol is utilized to enlarge the void free volume of cationic modified polyester, which is conducive to the entry of dye molecules so as to improve the dyeing performance of polyester fiber with a relatively low SIPE loading. Accordingly, the spinnability of the cationic modified polyester and the quality of the polyester fiber will be improved. Specifically, wherein the tert-butyl group is an optimized option prior to both the short chain substitution (such as methyl or ethyl group) and the long chain substitution. Compared with short substitution chains, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. Furthermore, large free volume is favorable to the penetration of air or water into the polyester, hence can improve its natural degradation performance to a certain extent.

The starting point of hydrolysis in a polyester is the end carboxyl group, wherein the lone pair electrons in hydroxyl O atom will be delocalized via conjugating with the $\pi$ electron of carbonyl group, which will weaken the hydroxyl bond and result in the decomposition of carboxyl group into an anion and a proton. Again, because of the electron delocalization, the negative charge in the decomposed carboxyl group will be evenly distributed between the two oxygen atoms, which will stabilize the carboxyl ion. The solid heteropolyacid imported in the present invention can decompose to release $H^+$ ions which can attack the carboxyl ion to form a tetrahedral intermediate and protonate the carbonyl oxygen atom then furtherly positively charge the carbonyl carbon atom, making it easy to be attacked by a nucleophilic agent with weak alkalinity such as $H_2O$. Because of the nucleophilic attack the acyloxy in the tetrahedral intermediate will be broken into a carboxylic acid and an alcohol. In this way, the acyloxy is constantly destroyed, the macromolecular chain is constantly broken, and the content of carboxyl group is increasing, which further promotes the hydrolysis of polyester and improves the degradation rate.

In the present invention, the imported tert-butyl branched diol and solid heteropoly acid will also promise a synergistic effect on accelerating the degradation rate of polyester, i.e., the solid heteropolyacid can enhance the protonate the carbonyl oxygen atom whereas the tert-butyl branched diol will enlarged the free volume of polyester so as to promote the penetration of water and oxygen necessary to the nucleophilic addition reaction.

The specific preparation process of solid heteropolyacid $SiO_2$—$TiO_2$ is as follows: dispersing 1 phr of silica powder in 50-60 phr of water by fully stirring, then dripping in 2-3 phr of titanyl sulfate solution with concentration of 4-5 wt %. Next, adjusting the pH value of the dispersion system to neutral with 0.5-1.0 mol/L sodium hydroxide solution and then to 8 with 8-10 wt % sulfuric acid. after aging for 1-2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C.-700° C. for 2-4 h to obtain solid heteropolyacid $SiO_2$—$TiO_2$.

The specific preparation process of solid heteropolyacid $SiO_2$—$ZrO_2$ is as follows: dispersing 1 phr of silica powder in 50-60 phr of water by fully stirring, then dripping in 2-3 phr of zirconium sulfate solution with concentration of 4-5 wt %. Next, adjusting the pH value of the dispersion system to neutral with 0.5-1.0 mol/L sodium hydroxide solution and then to 8 with 8-10 wt % sulfuric acid. after aging for 1-2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C.-700° C. for 2-4 h to obtain solid heteropolyacid $SiO_2$—$ZrO_2$.

The specific preparation process of solid heteropolyacid $B_2O_3$—$Al_2O_3$ is as follows: dripping 2-3 phr of aluminum sulfate solution with concentration of 4-5 wt % into 1 phr of boric acid, then adjusting the pH value of the dispersion system to neutral with 0.5-1.0 mol/L sodium hydroxide solution and then to 8 with 8-10 wt % sulfuric acid. after aging for 1-2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C.-700° C. for 2-4 h to obtain solid heteropolyacid $B_2O_3$—$Al_2O_3$.

The specific preparation process of solid heteropolyacid $TiO_2$—$ZnO$ is as follows: dripping 2-3 phr of titanyl sulfate solution with concentration of 4-5 wt % into 1 phr of zinc sulfate, then adjusting the pH value of the dispersion system to neutral with 0.5-1.0 mol/L sodium hydroxide solution and then to 8 with 8-10 wt % sulfuric acid. after aging for 1-2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C.-700° C. for 2-4 h to obtain solid heteropolyacid $TiO_2$—$ZnO$.

The specific preparation process of solid heteropolyacid $SiO_2$—$CaO$ is as follows: dispersing 1 phr of silica powder in 50-60 phr of water by fully stirring, then dripping in 2-3 phr of calcium sulfate solution with concentration of 4-5 wt %. Next, adjusting the pH value of the dispersion system to neutral with 0.5-1.0 mol/L sodium hydroxide solution and then to 8 with 8-10 wt % sulfuric acid. after aging for 1-2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C.-700° C. for 2-4 h to obtain solid heteropolyacid $SiO_2$—$CaO$.

The following preferred technology program, is presented to give a detailed description for this invention.

In the preparing method of the cationic dyeable polyester fiber hereinabove, wherein said tert-butyl branched diol is synthesized by means of:

(1) mixing 40-50 wt % of aqueous potassium hydroxide solution and isobutanol in a mole ratio 5-6:1 of potassium hydroxide to isobutanol at first, and then stirring the mixture and carrying out the reaction under 100-110° C. for 4-5 hr to obtain potassium isobutanol;

(2) removing the impurities from the system of (1) and cooling the system to normal temperature, then adding in xylene in a mole ratio 1.3-1.5:2.0-3.0 of potassium isobutanol to xylene and furtherly reducing the temperature to 0-5° C.;

(3) adding 3-methyl-3-hydroxybutyne and M into the system of (2) with the mole ratio of 3-methyl-3-hydroxybutyne, M and xylene being 1:1.2-1.3:2.0-3.0, then carrying out the reaction under 40-50° C. for 3 hr, finally obtaining octynylenediol through a series of processes of cooling crystallization, centrifugal separation and drying;

(4) mixing octynylenediol, alcohol and Pd catalyst in the weight ratio of 2-3:10:0.01-0.03, then carrying out the reaction accompanied with a continuous hydrogen input at 40-50° C. for 50-60 min, finally obtaining the tert-butyl branched diol through a series of processes of separation and purification.

In the Formula 1 of the tert-butyl branched diol, when R is —H, —CH$_2$CH$_3$, —CH(CH$_3$)$_2$ or —C(CH$_3$)$_3$, respectively, accordingly M should be referred to 2,2-dimethylpropanal, 2,2-dimethyl-3-pentanone, 2,2,4-trimethyl-3-pentanone or 2,2,4,4-tetramethyl-3-pentanone.

In the preparing method of the cationic dyeable polyester fiber hereinabove, wherein said calcining time of solid heteropolyacid is 2-4 hr, and the content of TiO$_2$, ZrO$_2$, Al$_2$O$_3$, ZnO and CaO in SiO$_2$—TiO$_2$, SiO$_2$—ZrO$_2$, B$_2$O$_3$—Al$_2$O$_3$, TiO$_2$—ZnO and SiO$_2$—CaO are 30~50 wt %, 30~50 wt %, 20~40 wt %, 20~40 wt % and 20~50 wt %, respectively, in addition after the calcining the solid heteropolyacids are all ground into fine powders with an average diameter less than 0.5 micron.

In the preparing method of the cationic dyeable polyester fiber hereinabove, wherein said modified polyester has an average molecular weight of 24000-28000 and a molecular weight distribution index of 1.9-2.4.

In the preparing method of the cationic dyeable polyester fiber hereinabove, wherein said modified polyester is prepared by means of:

(1) Esterification concocting PTA, EG, SIPE and the tert-butyl branched diol into a slurry, then adding in the calcined solid heteropolyacid powder, the catalyst, the matting agent and the stabilizer and carrying out the esterification in a nitrogen atmosphere with a pressure of normal value-0.3 MPa at 240~250° C., finally ending the reaction when the water distillation reaching more than 90% of the theoretical value;

(2) Polycondensation smoothly reducing the pressure of the system of (1) to less than 500 Pa within 30~50 min and carrying out reaction at 250-260° C. for 30~50 min, successively, further reducing the pressure to less than 100 Pa and continuing the reaction at 270-275° C. for 50-90 min.

In the preparing method of the cationic dyeable polyester fiber hereinabove, the molar ratio of PTA, EG and the tert-butyl branched diol is 1:1.2-2.0:0.03-0.05, and being relative to the amount of PTA, the addition of SIPE is 1.2-1.6 mol %. Generally, in the existent technologies the dosage of SIPE is 2-3 mol % (vs. PTA), the amount of SIPE could be reduced because of the incorporation of the tert-butyl branched diol, which be helpful to enhance the dyeing performance of the modified polyester. Meanwhile, the additions of the solid heteropolyacid, the catalyst, the matting agent and the stabilizer respecting to PTA are 0.03-0.05 wt %, 0.03-0.05 wt %, 0.20-0.25 wt % and 0.01-0.05 wt %, respectively. Especially, the usage of the solid heteropolyacid is not restricted but adjustable according to the exact case, however the adjusting range should not be too large. If the addition amount is too large, it will heavily break the molecular regularity of PET so as to affect the crystalline and mechanical properties of the fiber in the future application, whereas if the addition amount is too small, it can hardly show the modification efficiency.

In the preparing method of the cationic dyeable polyester fiber hereinabove, wherein said catalyst is one of antimony trioxide, antimony glycol or antimony acetate, wherein said matting agent is titanium dioxide, and wherein said stabilizer is one of triphenyl phosphate, trimethyl phosphate or trimethyl phosphite;

In the preparing method of the cationic dyeable polyester fiber hereinabove, wherein said FDY process of the modified polyester includes steps of metering, spinneret extruding, cooling, oiling, stretching, heat setting and winding;

and wherein said FDY process involves the technological parameters of spinning temperature 270-280° C., cooling temperature 18-20° C., interlacing pressure 0.20-0.30 MPa, godet roller 1 speed 2200-2600 m/min, godet roller 1 temperature 75-90° C., godet roller 2 speed 3600-3900 m/min, godet roller 2 temperature 105-120° C., winding speed 3560-3850 m/min.

Hereinabove the technological parameters of FDY processes should not be considered as the limitations but just one of the feasible schemes.

In the present invention the cationic dyeable polyester fiber obtained through the preparing method hereinabove is also provided, which is a type of cationic modified polyester FDY;

wherein said cationic modified polyester has a molecular chain structure composed of the PTA segments, the EG segments, the SIPE segments and the tert-butyl branched diol segments and is dispersed by the calcined solid heteropolyacid powder.

Prepared through the preferred technology program mentioned above, herein obtained cationic dyeable polyester fiber has the following performance indices: monofilament fineness 0.5-1.2 dtex, breaking strength≥3.5 cN/dtex, elongation at break 33.0±4.0%, interlacing degree 12±2/m, linear density deviation rate≤1.0%, breaking strength CV value≤5.0%, elongation at break CV value≤8.0%, boiling water shrinkage rate 8.0±0.5%, which are close to those of the common cationic dyeable polyester fiber, because the addition amounts of the tert-butyl branched diol and the solid heteropolyacid in the present invention are so small as not to obviously affect the processiblity and mechanical performance of the filament;

herein obtained cationic dyeable polyester fiber has a dye uptake of 87.8-92.2% and a K/S value of 23.27-25.67 when dyed at 120° C. whereas those for the contrast sample (made of the common cationic dyeable polyester without addition of the solid heteropolyacid powder) are 86.7% and 22.75, respectively, even being dyed under 130° C., implying herein obtained cationic dyeable polyester fiber could be dyed with much higher dye uptake, lower dyeing temperature, shorter dyeing time and less energy consumptions.

herein obtained cationic dyeable polyester fiber has an intrinsic viscosity drop of 13-17% after a storage at 25° C. and R.H. 65% for 60 months whereas that for the contrast sample (made of the common cationic dyeable polyester without addition of the solid heteropolyacid powder) is just 5%, implying the incorporation of the tert-butyl branched diol and the solid heteropolyacid can significantly accelerate the natural degradation rate of PET fiber.

The mechanism of this invention could be described as follows.

The accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules.

The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

The backbone conformation of the straight-chain diols, such as ethylene glycol and 1,4-butanediol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

In the present invention, the dyeing performance and the natural degradation rate of the cationic dyeable polyester fiber is improved by introducing the tert-butyl branded diol into the PET molecular chains, wherein the tert-butyl branded diol has a molecular formula as

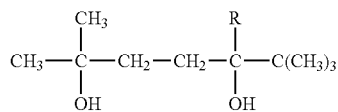

with R standing for —H (2,6,6-trimethyl-2,5-heptadiol), —CH$_2$CH$_3$ (2,6,6-trimethyl-5-ethyl-2,5-heptadiol), —CH(CH$_3$)$_2$ (2,6,6-trimethyl-5-isopropyl-2,5-heptadiol) or —C(CH$_3$)$_3$ (2,6,6-trimethyl-5-tert-butyl-2,5-heptadiol), respectively.

The existence of the tert-butyl branded diol in PET will change the mobility of the main chain of PET so as to change the interaction force and the distance between PET molecular chains, finally enlarging the void free volumes of PET. The size of substituent R will affect the void free volume to some extent, i.e., the larger the R size is, the larger the void free volume is, and when R=—C(CH$_3$)$_3$ the largest free volume will be achieved. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. Disperse dyes, known as the main coloring agent for polyester, are some small molecules without water-soluble groups, and mostly exist in the form of particles with a size ranged from several hundred nanometers to one micron. Therefore, the dyeing with disperse dye is usually of rather slow rate under 100° C., and even in boiled dyeing bath, it is still difficult to gain a high dye uptake. Fortunately, the movement of polyester molecules will be stimulated by the bath temperature, and the side group (affording void free volume) can move earlier and more violently than the main chain (affording slit free volume), hence importing appropriate side groups will be help to the dyeing because the void free volume is more efficient than the slit one for the penetration of dye particles into the fiber. In the present invention, the void free volume of the cationic dyeable PET is enlarged by the modification mentioned above, hence the obtained filament could be dyed with higher dye uptake but shorter dyeing time, lower dyeing temperature and less energy consumption. Therefore, the dye site producer, i.e., the third monomer addition could be reduced so as to promote the spinnability of the modified polyester and obtain the cationic dyeable polyester fiber with excellent comprehensive properties.

The hydrolysis of polyester is the reverse reaction of esterification, essentially, which is the breaking process of acyloxy bond in ester bond, i.e., nucleophilic addition of nucleophilic reagent attacks carbonyl group to form tetrahedral intermediate and then a negative ion is eliminated to complete the hydrolysis. An important reason for the slow hydrolysis rate of common polyester is that the carbonyl carbon atoms in polyester have low ability to accept the attack of nucleophilic reagent. This is because the carbonyl carbon atoms in polyester are surrounded by electron donating groups and lack of electron withdrawing groups. As a result, in general the stronger nucleophilic reagents are needed to react with the carbonyl carbon atoms in polyester.

In the present invention, the ability of carbonyl carbon atom in cationic modified polyester to receive nucleophilic reagent attack is significantly improved by adding solid heteropolyacid into the raw material for preparing cationic modified polyester, and the hydrolysis rate of cationic modified polyester is further improved. The solid heteropolyacid selected in the invention is a kind of strong acidic polynuclear coordination acid catalyst composed of heteroatoms (central atoms) and metal atoms (coordination atoms) bridged by oxygen atoms, which has strong high temperature resistance and catalytic activity, and its catalytic function comes from the acidic part with catalytic activity existing on the solid surface. Due to its high temperature resistance, the solid heteropolyacid can be used in polymerization step of the polyester, and because the esterification reaction of polyester is carried out under acidic conditions where the acid acts as esterification catalyst. Therefore, the addition of solid heteropolyacid will not have adverse effects on the polymerization reaction, but will only be of promotion to the esterification reaction of PTA and EG, reducing the reaction temperature and the side reactions in the esterification process.

The starting point of hydrolysis in the cationic dyeable polyester is the end carboxyl group, wherein the lone pair electrons in hydroxyl O atom will be delocalized via conjugating with the π electron of carbonyl group, which will weaken the hydroxyl bond and result in the decomposition of carboxyl group into an anion and a proton. Again, because of the electron delocalization, the negative charge in the decomposed carboxyl group will be evenly distributed between the two oxygen atoms, which will stabilize the carboxyl ion. The solid heteropolyacid imported in the present invention can decompose to release H$^+$ ions which can attack the carboxyl ion to form a tetrahedral intermediate and protonate the carbonyl oxygen atom then furtherly positively charge the carbonyl carbon atom, making it easy to be attacked by a nucleophilic agent with weak alkalinity such as H$_2$O. Because of the nucleophilic attack the acyloxy in the tetrahedral intermediate will be broken into a carboxylic acid and an alcohol. In this way, the acyloxy is constantly destroyed, the macromolecular chain is constantly broken, and the content of carboxyl group is increasing, which further promotes the hydrolysis of polyester and improves the degradation rate.

In the present invention, the imported tert-butyl branched diol and solid heteropoly acid will also promise a synergistic effect on accelerating the degradation rate of polyester, i.e., the solid heteropolyacid can enhance the protonate the carbonyl oxygen atom whereas the tert-butyl branched diol will enlarged the free volume of polyester so as to promote the penetration of water and oxygen necessary to the nucleophilic addition reaction.

In conclusion, the present invention provides (1) a method for preparing the cationic dyeable polyester fiber, wherein the dye uptake and the natural degradation rate are improved by importing the modifier, i.e., the tert-butyl branched diol which and reduce the addition of third monomer, dyeing temperature and dyeing time;

(2) a method for preparing the cationic dyeable polyester fiber, wherein the degradation rate of the filament is improved by importing the solid heteropolyacid;

(3) a method for preparing the cationic dyeable polyester fiber with advantages of low cost, easy to operate and appreciable application value;

(4) a type of cationic dyeable polyester fiber with good dyeing performance, rapid natural degradation, high mechanical properties and broad application prospects.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

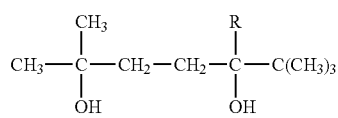

Formula (I)

Example 1

A method for preparing the cationic dyeable polyester fiber, comprising the steps:

(1) Preparation of the Cationic Modified Polyester (1.1) Synthesizing 2,6,6-Trimethyl-2,5-Heptanediol (a) mixing isobutanol and 43% of KOH aqueous solution in the molar ratio of isobutanol to KOH as 5:1, then carrying out the reaction with a stirring at 100° C. for 4 hr to obtain potassium isobutanol;

(b) removing the impurities from the system in step (a), then adding in xylene in the molar ratio of isobutanol to xylene as 1.3:2.2 and cooling the system to 1° C.;

(c) adding 3-methyl-3-hydroxybutyne and 2,2-dimethyl-propionaldehyde into the system of step (b) in a molar ratio of 3-methyl-3-hydroxybutyne:2,2-dimethylpropionaldehyde:xylene as 1:1.2:2.2, then starting the reaction at 25° C. for 3 hr, and obtaining octynyl diol after a series of processes of cooling crystallization, centrifugation and drying;

(d) mixing octynyl diol, ethanol and Pd catalyst in a weight ratio of 2.2:10:0.01 and then carrying out the reaction accompanied with a continuous hydrogen input at 50° C. for 50 min, finally obtaining 2,6,6-trimethyl-2,5-heptanediol (just as demonstrated in Formula (I) with R=—H) through a series of processes of separation and purification;

(1.2) Preparation of Solid Heteropolyacid $SiO_2$—$TiO_2$ dispersing 1 phr of silica powder in 55 phr of water by fully stirring, then dripping in 2 phr of titanyl sulfate solution with concentration of 4.5 wt %. Next, adjusting the pH value of the dispersion system to neutral with 1.0 mol/L sodium hydroxide solution and then to 8 with 10 wt % sulfuric acid. after aging for 2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 500° C. for 2 h and then grinding to obtain solid heteropolyacid $SiO_2$—$TiO_2$ with an average diameter of 0.4 micron and a $TiO_2$ content of 42 wt %;

(1.3) Esterification concocting PTA, EG, SIPE and 2,6,6-trimethyl-2,5-heptanediol into a slurry, then adding in the calcined $SiO_2$—$TiO_2$ powder, antimony trioxide, titanium dioxide and triphenyl phosphate and carrying out the esterification in a nitrogen atmosphere with a pressure of normal value at 240° C., finally ending the reaction when the water distillation reaching 90% of the theoretical value, wherein the molar ratio of PTA, EG and 2,6,6-trimethyl-2,5-heptanediol being 1:1.2:0.03, and respecting to PTA the additions of SIPE, $SiO_2$—$TiO_2$, antimony trioxide, titanium dioxide and triphenyl phosphate are 1.3 mol %, 0.03 wt %, 0.033 wt %, 0.20 wt % and 0.04 wt %, respectively;

(1.4) Polycondensation smoothly reducing the pressure of the system of (1) to less than 480 Pa within 40 min and carrying out reaction at 250° C. for 30 min, successively, further reducing the pressure to less than 80 Pa and continuing the reaction at 270° C. for 50 min. finally obtaining the cationic modified polyester with a molecular weight of 24000 and a molecular weight distribution index of 1.9;

(2) Spinning of Cationic Dyeable Polyester Fiber through a FDY technological way including stages of metering, spinneret extruding (at 272° C.), cooling (at 18° C.), oiling, stretching as well as heat setting (carried on with the parameters of interlacing pressure 0.25 MPa, godet roller 1 speed 2200 m/min, godet roller 1 temperature 75° C., godet roller 2 speed 3600 m/min, godet roller 2 temperature 110° C.), and winding (3600 m/min), converting the cationic dyeable polyester fiber.

Finally obtained cationic dyeable polyester fiber has the following performance indices: monofilament fineness 0.5 dtex, breaking strength 3.6 cN/dtex, elongation at break 34.0%, interlacing degree 11/m, linear density deviation rate 0.92%, breaking strength CV value 4.68%, elongation at break CV value 8.0%, boiling water shrinkage rate 8.2%.

The cationic dyeable polyester fiber has a dye uptake of 87.8% and a K/S value of 24.38 when dyed under 120° C.

The cationic dyeable polyester fiber has an intrinsic viscosity drop of 17% after stored at 25° C. and R.H. 65% for 60 months.

Comparison 1

A method for preparing the cationic dyeable polyester fiber involved steps basically the same as those in Example1, except for no addition of 2,6,6-trimethyl-2,5-heptanediol and $SiO_2$—$TiO_2$, i.e., no more modification than that of SIPE for PET, and the obtained cationic dyeable polyester fiber has the following performance indices: monofilament fineness 0.5 dtex, breaking strength 3.5 cN/dtex, elongation at break 33.0%, interlacing degree 11/m, linear density deviation rate 0.92%, breaking strength CV value 4.72%, elongation at break CV value 8.0%, boiling water shrinkage rate 8.0%, dye uptake 86.7%, K/S value 22.75 (dyed at 130° C.), and intrinsic viscosity drop 4.8% (after stored at 25° C. and R.H.65% for 60 months).

From the analysis on the data of Example 1 and Comparison 1, it can be concluded that the cationic dyeable polyester fiber, compared with the common one, could gain a much higher dye uptake with lower dyeing temperature, shorter dyeing time and less energy consumption, as well as a fairly rapider natural degradation rate suitable for the recycling. Moreover, the additives of 2,6,6-trimethyl-2,5-heptanediol and $SiO_2$—$TiO_2$ just draw little effects on the other properties of the fiber such as the processablity and the mechanical performance.

Comparison 2

A method for preparing the cationic dyeable polyester fiber involved steps basically the same as those in Example1, except for adopting 1,2-dodecyl glycol instead of 2,6,6-trimethyl-2,5-heptanediol in step (1), and the obtained cationic dyeable polyester fiber has the following performance indices: monofilament fineness 0.5 dtex, breaking strength 3.7 cN/dtex, elongation at break 33.0%, interlacing degree 11/m, linear density deviation rate 0.92%, breaking strength CV value 4.6%, elongation at break CV value 8.0%, boiling water shrinkage rate 8.1%, dye uptake 85.8%, K/S value 21.76 (dyed at 130° C.), and intrinsic viscosity drop 10.5% (after stored at 25° C. and R.H.65% for 60 months).

From the analysis on the data of Example 1 and Comparison 1, it can be concluded that the tert-butyl branched diol (2,6,6-trimethyl-2,5-heptanediol), compared with 1,2-dodecyl glycol containing long alkyl chain, is more beneficial to the natural degradation of PET fibers, and the reason on one hand is that the short side chain can enlarge the void free volume whereas the long side can mainly enlarge the slit free volume, and the void free volume is more efficient than the slit one for the penetration of activator agents into the fiber, on the other hand, the short side chain with higher rigidity will seldom cause the molecular chain entanglement and gain more free volume in the molecular aggregate.

Example 2

A method for preparing the cationic dyeable polyester fiber, comprising the steps:

(1) Preparation of the Cationic Modified Polyester (1.1) Synthesizing 2,6,6-trimethyl-2,5-heptanediol (a) mixing isobutanol and 40% of KOH aqueous solution in the molar ratio of isobutanol to KOH as 5.5:1, then carrying out the reaction with a stirring at 100° C. for 5 hr to obtain potassium isobutanol;

(b) removing the impurities from the system in step (a), then adding in xylene in the molar ratio of isobutanol to xylene as 1.3:2.0 and cooling the system to 3° C.;

(c) adding 3-methyl-3-hydroxybutyne and 2,2-dimethylpropionaldehyde into the system of step (b) in a molar ratio of 3-methyl-3-hydroxybutyne:2,2-dimethylpropionaldehyde:xylene as 1:1.3:2.5, then starting the reaction at 30° C. for 3 hr, and obtaining octynyl diol after a series of processes of cooling crystallization, centrifugation and drying;

(d) mixing octynyl diol, ethanol and Pd catalyst in a weight ratio of 2.5:10:0.01 and then carrying out the reaction accompanied with a continuous hydrogen input at 50° C. for 55 min, finally obtaining 2,6,6-trimethyl-2,5-heptanediol (just as demonstrated in Formula (I) with R=—H) through a series of processes of separation and purification;

(1.2) Preparation of Solid Heteropolyacid $SiO_2$—$ZrO_2$ dispersing 1 phr of silica powder in 58 phr of water by fully stirring, then dripping in 2 phr of zirconium sulfate solution with concentration of 5 wt %. Next, adjusting the pH value of the dispersion system to neutral with 1.0 mol/L sodium hydroxide solution and then to 8 with 10 wt % sulfuric acid. after aging for 1 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 400° C. for 4 h and then grinding to obtain solid heteropolyacid $SiO_2$—$ZrO_2$ with an average diameter of 0.45 micron and a $ZrO_2$ content of 45 wt %;

(1.3) Esterification concocting PTA, EG, SIPE and 2,6,6-trimethyl-2,5-heptanediol into a slurry, then adding in the calcined $SiO_2$—$ZrO_2$ powder, antimony glycol, titanium dioxide and trimethyl phosphate and carrying out the esterification in a nitrogen atmosphere with a pressure of 0.1 MPa at 242° C., finally ending the reaction when the water distillation reaching 93% of the theoretical value, wherein the molar ratio of PTA, EG and 2,6,6-trimethyl-2,5-heptanediol being 1:1.3:0.035, and respecting to PTA the additions of SIPE, $SiO_2$—$ZrO_2$, antimony glycol, titanium dioxide and trimethyl phosphate are 1.4 mol %, 0.04 wt %, 0.03 wt %, 0.25 wt % and 0.01 wt %, respectively;

(1.4) Polycondensation smoothly reducing the pressure of the system of (1) to less than 500 Pa within 44 min and carrying out reaction at 252° C. for 32 min, successively, further reducing the pressure to less than 90 Pa and continuing the reaction at 270° C. for 55 min. Finally obtaining the cationic modified polyester with a molecular weight of 24800 and a molecular weight distribution index of 1.9;

(2) Spinning of Cationic Dyeable Polyester Fiber through a FDY technological way including stages of metering, spinneret extruding (at 270° C.), cooling (at 19° C.), oiling, stretching as well as heat setting (carried on with the parameters of interlacing pressure 0.23 MPa, godet roller 1 speed 2300 m/min, godet roller 1 temperature 75° C., godet roller 2 speed 3700 m/min, godet roller 2 temperature 105° C.), and winding (3720 m/min), converting the cationic dyeable polyester fiber.

Finally obtained cationic dyeable polyester fiber has the following performance indices: monofilament fineness 0.8 dtex, breaking strength 3.5 cN/dtex, elongation at break 33.0%, interlacing degree 11/m, linear density deviation rate 0.95%, breaking strength CV value 4.95%, elongation at break CV value 7.9%, boiling water shrinkage rate 7.5%.

The cationic dyeable polyester fiber has a dye uptake of 92.2% and a K/S value of 23.27 when dyed under 120° C.

The cationic dyeable polyester fiber has an intrinsic viscosity drop of 14% after stored at 25° C. and R.H.65% for 60 months.

Example 3

A method for preparing the cationic dyeable polyester fiber, comprising the steps:

(1) Preparation of the Cationic Modified Polyester (1.1) Synthesizing 2,6,6-trimethyl-5-ethyl-2,5-heptadiol (a) mixing isobutanol and 48% of KOH aqueous solution in the molar ratio of isobutanol to KOH as 5:1, then carrying out the reaction with a stirring at 105° C. for 4.5 hr to obtain potassium isobutanol;

(b) removing the impurities from the system in step (a), then adding in xylene in the molar ratio of isobutanol to xylene as 1.5:2.5 and cooling the system to 0° C.;

(c) adding 3-methyl-3-hydroxybutyne and 2,2-dimethyl-3-pentanone into the system of step (b) in a molar ratio of 3-methyl-3-hydroxybutyne:2,2-dimethyl-3-pentanone:xylene as 1:1.25:2.0, then starting the reaction at 30° C. for 3 hr, and obtaining octynyl diol after a series of processes of cooling crystallization, centrifugation and drying;

(d) mixing octynyl diol, ethanol and Pd catalyst in a weight ratio of 2:10:0.02 and then carrying out the reaction accompanied with a continuous hydrogen input at 42° C. for 60 min, finally obtaining 2,6,6-trimethyl-5-ethyl-2,5-heptadiol (just as demonstrated in Formula (I) with R=—$CH_2CH_3$) through a series of processes of separation and purification;

(1.2) Preparation of Solid Heteropolyacid $B_2O_3$—$Al_2O_3$ dripping 2.5 phr of aluminum sulfate solution with concentration of 4 wt % into 1 phr of boric acid, then adjusting the pH value of the dispersion system to neutral with 1.0 mol/L sodium hydroxide solution and then to 8 with 9 wt % sulfuric acid. after aging for 1.5 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 700° C. for 2 h to obtain solid heteropolyacid $B_2O_3$—$Al_2O_3$ with a $Al_2O_3$ content of 30 wt %;

(1.3) Esterification concocting PTA, EG, SIPE and 2,6,6-trimethyl-5-ethyl-2,5-heptadiol into a slurry, then adding in the calcined $B_2O_3$—$Al_2O_3$ powder, antimony acetate, titanium dioxide and trimethyl phosphite and carrying out the esterification in a nitrogen atmosphere with a pressure of 0.2 MPa at 244° C., finally ending the reaction when the water distillation reaching 95% of the theoretical value, wherein the molar ratio of PTA, EG and 2,6,6-trimethyl-5-ethyl-2,5-heptadiol being 1:1.5:0.037, and respecting to PTA the additions of SIPE, $B_2O_3$—$Al_2O_3$, antimony acetate, titanium dioxide and trimethyl phosphite are 1.2 mol %, 0.04 wt %, 0.04 wt %, 0.21 wt % and 0.03 wt %, respectively;

(1.4) Polycondensation smoothly reducing the pressure of the system of (1) to less than 400 Pa within 38 min and carrying out reaction at 251° C. for 33 min, successively, further reducing the pressure to less than 100 Pa and continuing the reaction at 271° C. for 60 min. finally obtaining the cationic modified polyester with a molecular weight of 25000 and a molecular weight distribution index of 2.0;

(2) Spinning of Cationic Dyeable Polyester Fiber through a FDY technological way including stages of metering, spinneret extruding (at 270° C.), cooling (at 20° C.), oiling, stretching as well as heat setting (carried on with the parameters of interlacing pressure 0.20 MPa, godet roller 1 speed 2500 m/min, godet roller 1 temperature 85° C., godet roller 2 speed 3650 m/min, godet roller 2 temperature 115° C.), and winding (3800 m/min), converting the cationic dyeable polyester fiber.

Finally obtained cationic dyeable polyester fiber has the following performance indices: monofilament fineness 1.2 dtex, breaking strength 3.58 cN/dtex, elongation at break 33.0%, interlacing degree 10/m, linear density deviation rate 0.92%, breaking strength CV value 5.00%, elongation at break CV value 7.92%, boiling water shrinkage rate 7.5%.

The cationic dyeable polyester fiber has a dye uptake of 87.8% and a K/S value of 23.27 when dyed under 120° C.

The cationic dyeable polyester fiber has an intrinsic viscosity drop of 13% after stored at 25° C. and R.H. 65% for 60 months.

Example 4

A method for preparing the cationic dyeable polyester fiber, comprising the steps:

(1) Preparation of the Cationic Modified Polyester (1.1) Synthesizing 2,6,6-trimethyl-5-ethyl-2,5-heptadiol (a) mixing isobutanol and 41% of KOH aqueous solution in the molar ratio of isobutanol to KOH as 6:1, then carrying out the reaction with a stirring at 110° C. for 4.8 hr to obtain potassium isobutanol;

(b) removing the impurities from the system in step (a), then adding in xylene in the molar ratio of isobutanol to xylene as 1.4:3.0 and cooling the system to 0° C.;

(c) adding 3-methyl-3-hydroxybutyne and 2,2-dimethyl-3-pentanone into the system of step (b) in a molar ratio of 3-methyl-3-hydroxybutyne:2,2-dimethyl-3-pentanone:xylene as 1:1.3:2.6, then starting the reaction at 35° C. for 3 hr, and obtaining octynyl diol after a series of processes of cooling crystallization, centrifugation and drying;

(d) mixing octynyl diol, ethanol and Pd catalyst in a weight ratio of 3:10:0.01 and then carrying out the reaction accompanied with a continuous hydrogen input at 40° C. for 60 min, finally obtaining 2,6,6-trimethyl-5-ethyl-2,5-heptadiol (just as demonstrated in Formula (I) with R=—$CH_2CH_3$) through a series of processes of separation and purification;

(1.2) Preparation of Solid Heteropolyacid $TiO_2$—ZnO dripping 3 phr of titanyl sulfate solution with concentration of 5 wt % into 1 phr of zinc sulfate, then adjusting the pH value of the dispersion system to neutral with 1.0 mol/L sodium hydroxide solution and then to 8 with 10 wt % sulfuric acid. after aging for 2 h, washing the dispersion system with deionized water until no $SO_4^{2-}$ detection, and then filtering it under the vacuum and washing the filter cake with anhydrous ethanol for several times, further, drying the cake under 100° C. in an oven, finally calcining the dry cake at 600° C. for 2.5 h to obtain solid heteropolyacid $TiO_2$—ZnO with an average diameter of 0.45 micron and a ZnO content of 35 wt %;

(1.3) Esterification concocting PTA, EG, SIPE and 2,6,6-trimethyl-5-ethyl-2,5-heptadiol into a slurry, then adding in the calcined $TiO_2$—ZnO powder, antimony acetate, titanium dioxide and triphenyl phosphate and carrying out the esterification in a nitrogen atmosphere with a pressure of the normal value at 246° C., finally ending the reaction when the water distillation reaching 99% of the theoretical value, wherein the molar ratio of PTA, EG and 2,6,6-trimethyl-5-ethyl-2,5-heptadiol being 1:1.6:0.038, and respecting to PTA the additions of SIPE, $TiO_2$—ZnO, antimony acetate, titanium dioxide and triphenyl phosphate are 1.2 mol %, 0.03 wt %, 0.05 wt %, 0.20 wt % and 0.02 wt %, respectively;

(1.4) Polycondensation smoothly reducing the pressure of the system of (1) to less than 460 Pa within 30 min and carrying out reaction at 253° C. for 35 min, successively, further reducing the pressure to less than 88 Pa and continuing the reaction at 272° C. for 65 min. finally obtaining the cationic modified polyester with a molecular weight of 25500 and a molecular weight distribution index of 2.2;

(2) Spinning of Cationic Dyeable Polyester Fiber through a FDY technological way including stages of metering, spinneret extruding (at 275° C.), cooling (at 19° C.), oiling, stretching as well as heat setting (carried on with the parameters of interlacing pressure 0.28 MPa, godet roller 1 speed 2600 m/min, godet roller 1 temperature 80° C., godet roller 2 speed 3900 m/min, godet roller 2 temperature 120° C.), and winding (3560 m/min), converting the cationic dyeable polyester fiber.

Finally obtained cationic dyeable polyester fiber has the following performance indices: monofilament fineness 0.7 dtex, breaking strength 3.55 cN/dtex, elongation at break 29.0%, interlacing degree 12/m, linear density deviation rate 1.00%, breaking strength CV value 4.97%, elongation at break CV value 7.95%, boiling water shrinkage rate 8.5%.

The cationic dyeable polyester fiber has a dye uptake of 90.3% and a K/S value of 25.67 when dyed under 120° C.

The cationic dyeable polyester fiber has an intrinsic viscosity drop of 13% after stored at 25° C. and R.H. 65% for 60 months.

Example 5

A method for preparing the cationic dyeable polyester fiber, comprising the steps:

(1) Preparation of the Cationic Modified Polyester (1.1) Synthesizing 2,6,6-trimethyl-5-isopropyl-2,5-heptadiol (a) mixing isobutanol and 50% of KOH aqueous solution in the molar ratio of isobutanol to KOH as 5.4:1, then carrying out the reaction with a stirring at 110° C. for 5 hr to obtain potassium isobutanol;

(b) removing the impurities from the system in step (a), then adding in xylene in the molar ratio of isobutanol to xylene as 1.4:2.6 and cooling the system to 4° C.;

(c) adding 3-methyl-3-hydroxybutyne and 2,2,4-trimethyl-3-pentanone into the system of step (b) in a molar ratio of 3-methyl-3-hydroxybutyne:2,2,4-trimethyl-3-pentanone:xylene as 1:1.2:3.0, then starting the reaction at 28° C. for 3 hr, and obtaining octynyl diol after a series of processes of cooling crystallization, centrifugation and drying;

(d) mixing octynyl diol, ethanol and Pd catalyst in a weight ratio of 2.5:10:0.03 and then carrying out the reaction accompanied with a continuous hydrogen input at 44° C. for 53 min, finally obtaining 2,6,6-trimethyl-5-isopropyl-2,5-heptadiol (just as demonstrated in Formula (I) with R=—CH(CH$_3$)$_2$) through a series of processes of separation and purification;

(1.2) Preparation of Solid Heteropolyacid SiO$_2$—CaO dispersing 1 phr of silica powder in 50 phr of water by fully stirring, then dripping in 3 phr of calcium sulfate solution with concentration of 5 wt %. Next, adjusting the pH value of the dispersion system to neutral with 1.0 mol/L sodium hydroxide solution and then to 8 with 10 wt % sulfuric acid. after aging for 2 h, washing the dispersion system with deionized water until no SO$_4^{2-}$ detection, and then filtering it under the vacuum and washing the filter cake with anhydrous ethanol for several times, further, drying the cake under 100° C. in an oven, finally calcining the dry cake at 650° C. for 3.5 h to obtain solid heteropolyacid SiO$_2$—CaO with an average diameter of 0.45 micron and a CaO content of 45 wt %;

(1.3) Esterification concocting PTA, EG, SIPE and 2,6,6-trimethyl-5-isopropyl-2,5-heptadiol into a slurry, then adding in the calcined SiO$_2$—CaO powder, antimony glycol, titanium dioxide and triphenyl phosphate and carrying out the esterification in a nitrogen atmosphere with a pressure of 0.2 MPa at 248° C., finally ending the reaction when the water distillation reaching 95% of the theoretical value, wherein the molar ratio of PTA, EG and 2,6,6-trimethyl-5-isopropyl-2,5-heptadiol being 1:1.5:0.04, and respecting to PTA the additions of SIPE, SiO$_2$—CaO, antimony glycol, titanium dioxide and triphenyl phosphate are 1.3 mol %, 0.05 wt %, 0.04 wt %, 0.24 wt % and 0.01 wt %, respectively;

(1.4) Polycondensation smoothly reducing the pressure of the system of (1) to less than 470 Pa within 42 min and carrying out reaction at 255° C. for 36 min, successively, further reducing the pressure to less than 92 Pa and continuing the reaction at 272° C. for 70 min. finally obtaining the cationic modified polyester with a molecular weight of 26300 and a molecular weight distribution index of 2.4;

(2) Spinning of Cationic Dyeable Polyester Fiber through a FDY technological way including stages of metering, spinneret extruding (at 280° C.), cooling (at 20° C.), oiling, stretching as well as heat setting (carried on with the parameters of interlacing pressure 0.30 MPa, godet roller 1 speed 2300 m/min, godet roller 1 temperature 90° C., godet roller 2 speed 3700 m/min, godet roller 2 temperature 110° C.), and winding (3850 m/min), converting the cationic dyeable polyester fiber.

Finally obtained cationic dyeable polyester fiber has the following performance indices: monofilament fineness 0.5 dtex, breaking strength 3.5 cN/dtex, elongation at break 37.0%, interlacing degree 14/m, linear density deviation rate 0.93%, breaking strength CV value 5.00%, elongation at break CV value 7.82%, boiling water shrinkage rate 8.5%.

The cationic dyeable polyester fiber has a dye uptake of 89.24% and a K/S value of 24.69 when dyed under 120° C.

The cationic dyeable polyester fiber has an intrinsic viscosity drop of 17% after stored at 25° C. and R.H. 65% for 60 months.

Example 6

A method for preparing the cationic dyeable polyester fiber, comprising the steps:

(1) Preparation of the Cationic Modified Polyester (1.1) Synthesizing 2,6,6-trimethyl-5-isopropyl-2,5-heptadiol (a) mixing isobutanol and 40% of KOH aqueous solution in the molar ratio of isobutanol to KOH as 5:1, then carrying out the reaction with a stirring at 106° C. for 4.5 hr to obtain potassium isobutanol;

(b) removing the impurities from the system in step (a), then adding in xylene in the molar ratio of isobutanol to xylene as 1.3:2.0 and cooling the system to 2° C.;

(c) adding 3-methyl-3-hydroxybutyne and 2,2,4-trimethyl-3-pentanone into the system of step (b) in a molar ratio of 3-methyl-3-hydroxybutyne:2,2,4-trimethyl-3-pentanone:xylene as 1:1.3:2.5, then starting the reaction at 32° C. for 3 hr, and obtaining octynyl diol after a series of processes of cooling crystallization, centrifugation and drying;

(d) mixing octynyl diol, ethanol and Pd catalyst in a weight ratio of 2.0:10:0.01 and then carrying out the reaction accompanied with a continuous hydrogen input at 48° C. for 50 min, finally obtaining 2,6,6-trimethyl-5-isopropyl-2,5-heptadiol (just as demonstrated in Formula (I) with R=—CH(CH$_3$)$_2$) through a series of processes of separation and purification;

(1.2) Preparation of Solid Heteropolyacid Powder mixing SiO$_2$—TiO$_2$ with an average diameter of 0.45 micron and SiO$_2$—ZrO$_2$ with an average diameter of 0.45 micron in a weight ratio 1:1 to obtain the solid heteropolyacid powder, in which the contents of TiO$_2$ and ZrO$_2$ in SiO$_2$—TiO$_2$ and SiO$_2$—ZrO$_2$ are 30 wt % and 50 wt %, respectively;

(1.3) Esterification concocting PTA, EG, SIPE and 2,6,6-trimethyl-5-isopropyl-2,5-heptadiol into a slurry, then adding in the calcined solid heteropolyacid powder, antimony trioxide, titanium dioxide and trimethyl phosphate and carrying out the esterification in a nitrogen atmosphere with a pressure of 0.3 MPa at 250° C., finally ending the reaction when the water distillation reaching 94% of the theoretical value, wherein the molar ratio of PTA, EG and 2,6,6-trimethyl-5-isopropyl-2,5-heptadiol being 1:1.8:0.042, and respecting to PTA the additions of SIPE, the heteropolyacid, antimony trioxide, titanium dioxide and trimethyl phosphate are 1.5 mol %, 0.05 wt %, 0.03 wt %, 0.21 wt % and 0.05 wt %, respectively;

(1.4) Polycondensation smoothly reducing the pressure of the system of (1) to less than 500 Pa within 46 min and carrying out reaction at 258° C. for 38 min, successively, further reducing the pressure to less than 95 Pa and continuing the reaction at 274° C. for 80 min. finally obtaining the cationic modified polyester with a molecular weight of 26700 and a molecular weight distribution index of 2.1;

(2) Spinning of Cationic Dyeable Polyester Fiber through a FDY technological way including stages of metering, spinneret extruding (at 271° C.), cooling (at 19° C.), oiling, stretching as well as heat setting (carried on with the parameters of interlacing pressure 0.22 MPa, godet roller 1 speed 2500 m/min, godet roller 1 temperature 75° C., godet roller 2 speed 3800 m/min, godet roller 2 temperature 105° C.), and winding (3740 m/min), converting the cationic dyeable polyester fiber.

Finally obtained cationic dyeable polyester fiber has the following performance indices: monofilament fineness 1.0 dtex, breaking strength 3.61 cN/dtex, elongation at break 33.0%, interlacing degree 10/m, linear density deviation rate 1.00%, breaking strength CV value 5.00%, elongation at break CV value 7.88%, boiling water shrinkage rate 8.0%.

The cationic dyeable polyester fiber has a dye uptake of 92.2% and a K/S value of 25.67 when dyed under 120° C.

The cationic dyeable polyester fiber has an intrinsic viscosity drop of 15% after stored at 25° C. and R.H. 65% for 60 months.

Example 7

A method for preparing the cationic dyeable polyester fiber, comprising the steps:

(1) Preparation of the Cationic Modified Polyester (1.1) Synthesizing 2,6,6-trimethyl-5-tert-butyl-2,5-heptadiol (a) mixing isobutanol and 46% of KOH aqueous solution in the molar ratio of isobutanol to KOH as 5.5:1, then carrying out the reaction with a stirring at 100° C. for 4 hr to obtain potassium isobutanol;

(b) removing the impurities from the system in step (a), then adding in xylene in the molar ratio of isobutanol to xylene as 1.3:2.6 and cooling the system to 5° C.;

(c) adding 3-methyl-3-hydroxybutyne and 2,2,4,4-tetramethyl-3-pentanone into the system of step (b) in a molar ratio of 3-methyl-3-hydroxybutyne:2,2,4,4-tetramethyl-3-pentanone:xylene as 1:1.24:3.0, then starting the reaction at 25° C. for 3 hr, and obtaining octynyl diol after a series of processes of cooling crystallization, centrifugation and drying;

(d) mixing octynyl diol, ethanol and Pd catalyst in a weight ratio of 3.0:10:0.03 and then carrying out the reaction accompanied with a continuous hydrogen input at 40° C. for 56 min, finally obtaining 2,6,6-trimethyl-5-tert-butyl-2,5-heptadiol (just as demonstrated in Formula (I) with R=—CH(CH$_3$)$_3$) through a series of processes of separation and purification;

(1.2) Preparation of Solid Heteropolyacid Powder mixing SiO$_2$—TiO$_2$, B$_2$O$_3$—Al$_2$O$_3$ and SiO$_2$—ZrO$_2$ (all with an average diameter of 0.45 micron) in a weight ratio 1:1:1 to obtain the solid heteropolyacid powder, in which the contents of TiO$_2$, Al$_2$O$_3$ and ZrO$_2$ in SiO$_2$—TiO$_2$, B$_2$O$_3$—Al$_2$O$_3$ and SiO$_2$—ZrO$_2$ are 50 wt %, 20 wt % and 20 wt %, respectively;

(1.3) Esterification concocting PTA, EG, SIPE and 2,6,6-trimethyl-5-tert-butyl-2,5-heptadiol into a slurry, then adding in the calcined solid heteropolyacid powder, antimony glycol, titanium dioxide and trimethyl phosphite and carrying out the esterification in a nitrogen atmosphere with a pressure of 0.3 MPa at 250° C., finally ending the reaction when the water distillation reaching 93% of the theoretical value, wherein the molar ratio of PTA, EG and 2,6,6-trimethyl-5-tert-butyl-2,5-heptadiol being 1:2.0:0.046, and respecting to PTA the additions of SIPE, the heteropolyacid, antimony glycol, titanium dioxide and trimethyl phosphite are 1.5 mol %, 0.03 wt %, 0.04 wt %, 0.25 wt % and 0.03 wt %, respectively;

(1.4) Polycondensation smoothly reducing the pressure of the system of (1) to less than 490 Pa within 35 min and carrying out reaction at 259° C. for 50 min, successively, further reducing the pressure to less than 83 Pa and continuing the reaction at 275° C. for 85 min. finally obtaining the cationic modified polyester with a molecular weight of 27000 and a molecular weight distribution index of 1.9;

(2) Spinning of Cationic Dyeable Polyester Fiber through a FDY technological way including stages of metering, spinneret extruding (at 277° C.), cooling (at 20° C.), oiling, stretching as well as heat setting (carried on with the parameters of interlacing pressure 0.30 MPa, godet roller 1 speed 2400 m/min, godet roller 1 temperature 85° C., godet roller 2 speed 3830 m/min, godet roller 2 temperature 115° C.), and winding (3820 m/min), converting the cationic dyeable polyester fiber.

Finally obtained cationic dyeable polyester fiber has the following performance indices: monofilament fineness 1.1 dtex, breaking strength 3.5 cN/dtex, elongation at break 37.0%, interlacing degree 14/m, linear density deviation rate 0.99%, breaking strength CV value 4.99%, elongation at break CV value 7.9%, boiling water shrinkage rate 8.5%.

The cationic dyeable polyester fiber has a dye uptake of 87.8% and a K/S value of 25.12 when dyed under 120° C.

The cationic dyeable polyester fiber has an intrinsic viscosity drop of 17% after stored at 25° C. and R.H. 65% for 60 months.

What is claimed is:

1. A preparing method for a cationic dyeable polyester fiber, comprising:
    manufacturing a fully drawn yarn (FDY) with a cationic modified polyester;
    wherein the cationic modified polyester is a product of an esterification reaction and a polycondensation reaction of a uniformly mixed mixture of terephthalic acid (PTA), ethylene glycol (EG), sodium salt of diethylene ester of 5-sulfoisophthalic acid (SIPE), a tert-butyl branched diol and a high temperature calcined solid heteropolyacid powder;
    wherein the tert-butyl branched diol has a molecular formula of

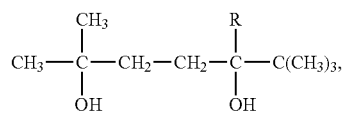

wherein R stands for —H, —CH$_2$CH$_3$, —CH(CH$_3$)$_2$ or —C(CH$_3$)$_3$;
    wherein a solid heteropolyacid is more than one of SiO$_2$—TiO$_2$, SiO$_2$—ZrO$_2$, B$_2$O$_3$—Al$_2$O$_3$, TiO$_2$—ZnO and SiO$_2$—CaO, and the solid heteropolyacid is calcined under a temperature of 400-700° C.

2. The preparing method of claim 1, wherein the tert-butyl branched diol is synthesized by the steps of:
    1) mixing 40-50 wt % of an aqueous potassium hydroxide solution and isobutanol in a mole ratio 5-6:1 of potassium hydroxide to the isobutanol at first to obtain a mixture, and then stirring the mixture and carrying out a first reaction under 100-110° C. for 4-5 hours to obtain potassium isobutanol;
    2) removing impurities from a system of step 1) and cooling the system of step 1) to a normal temperature, then adding in xylene in a mole ratio (1.3-1.5):(2.0-3.0) of the potassium isobutanol to the xylene and furtherly reducing a temperature to 0-5° C.;
    3) adding 3-methyl-3-hydroxybutyne and M into a system of step 2) with a mole ratio of the 3-methyl-3-hydroxybutyne, the M and the xylene being 1:(1.2-1.3):(2.0-3.0), then carrying out a second reaction under 40-50° C. for 3 hours, finally obtaining octynylenediol through a series of processes of a cooling crystallization, a centrifugal separation and a drying;
    4) mixing the octynylenediol, alcohol and a Pd catalyst in a weight ratio of (2-3):10:(0.01-0.03) then carrying out a third reaction accompanied with a continuous hydrogen input at 40-50° C. for 50-60 minutes, finally obtaining the tert-butyl branched diol through a series of processes of a separation and a purification;
    wherein R is —H, —CH$_2$CH$_3$, —CH(CH$_3$)$_2$ or —C(CH$_3$)$_3$, accordingly the M refers to 2,2-dimethylpropanal, 2,2-dimethyl-3-pentanone, 2,2,4-trimethyl-3-pentanone or 2,2,4,4-tetramethyl-3-pentanone, respectively.

3. The preparing method of claim 2, wherein a calcining time of the solid heteropolyacid is 2-4 hours, and a content of TiO$_2$, ZrO$_2$, Al$_2$O$_3$, ZnO and CaO in SiO$_2$—TiO$_2$, SiO$_2$—ZrO$_2$, B$_2$O$_3$—Al$_2$O$_3$, TiO$_2$—ZnO and SiO$_2$—CaO are 30-50 wt %, 30-50 wt %, 20-40 wt %, 20-40 wt % and 20-50 wt %, respectively, and in addition, after calcining the solid heteropolyacid, the solid heteropolyacid is ground into fine powders with an average diameter less than 0.5 micron.

4. The preparing method of claim 3, wherein the cationic modified polyester is manufactured through the following steps:
    1) the esterification reaction as follows:
    concocting the PTA, the EG, the SIPE and the tert-butyl branched diol into a slurry, then adding in the high temperature calcined solid heteropolyacid powder, the Pd catalyst, a matting agent and a stabilizer and carrying out the esterification reaction in a nitrogen atmosphere with a pressure of 101.325 kPa 0.3 MPa at 240-250° C., finally ending the esterification reaction when a water distillation reaching more than 90% of a theoretical value;
    2) the polycondensation reaction as follows:
    smoothly reducing a pressure of the system of step 1) to less than 500 Pa within 30-50 minutes and carrying out the polycondensation reaction at 250-260° C. for 30-50 minutes, successively, further reducing the pressure to less than 100 Pa and continuing the polycondensation reaction at 270-275° C. for 50-90 minutes.

5. The preparing method of claim 4, wherein a molar ratio of the PTA, the EG and the tert-butyl branched diol is 1:(1.2-2.0):(0.03-0.05) and a dosage of the SIPE is 1.2-1.6 mol % relative to an amount of the PTA, an amount of the SIPE is due to an incorporation of the tert-butyl branched diol to enhance dyeing performance of the cationic modified polyester, and additions of the solid heteropolyacid, the Pd catalyst, the matting agent and the stabilizer respecting to the PTA are 0.03-0.05 wt %, 0.03-0.05 wt %, 0.20-0.25 wt % and 0.01-0.05 wt %, respectively.

6. The preparing method of claim 5, wherein the Pd catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

7. The preparing method claim 6, wherein the cationic modified polyester has a molecular weight of 24000-28000 and a molecular weight distribution index of 1.9-2.4.

8. The preparing method of claim 1, wherein an FDY technique comprises the steps of metering, spinneret extruding, cooling, oiling, stretching, heat setting and winding;
    wherein an FDY process involves technological parameters of a spinning temperature of 270-280° C., a cooling temperature of 18-20° C., an interlacing pressure of 0.20-0.30 MPa, godet roller 1 speed of 2200-2600 m/min, godet roller 1 temperature of 75-90° C., godet roller 2 speed of 3600-3900 m/min, godet roller 2 temperature of 105-120° C., and a winding speed of 3560-3850 m/min.

9. A cationic dyeable polyester fiber prepared by the preparing method of claim 1, comprising a cationic modified polyester FDY;
    wherein the cationic modified polyester has a molecular chain structure composed of PTA segments, EG segments, SIPE segments and tert-butyl branched diol segments and the cationic modified polyester is dispersed by the high temperature calcined solid heteropolyacid powder.

10. The cationic dyeable polyester fiber of claim 9, wherein the cationic dyeable polyester fiber comprises:
    mechanical performance indices of a monofilament fineness 0.5-1.2 dtex, a breaking strength≥3.5 cN/dtex, an elongation at break 33.0±4.0%, an interlacing degree 12±2/m, a linear density deviation rate≤1.0%, a breaking strength CV value≤5.0%, an elongation at break CV value≤8.0%, and a boiling water shrinkage rate 8.0±0.5%;

a dye uptake of 87.8-92.2% and a K/S value of 23.27-25.67 when dyed under 120° C.; and an intrinsic viscosity drop of 13-17% after a storage at 25° C. and R.H. 65% for 60 months.

11. The cationic dyeable polyester fiber of claim 9, wherein the tert-butyl branched diol is synthesized by the steps of:
1) mixing 40-50 wt % of an aqueous potassium hydroxide solution and isobutanol in a mole ratio 5-6:1 of potassium hydroxide to the isobutanol at first to obtain a mixture, and then stirring the mixture and carrying out a first reaction under 100-110° C. for 4-5 hours to obtain potassium isobutanol;
2) removing impurities from a system of step 1) and cooling the system of step 1) to a normal temperature, then adding in xylene in a mole ratio (1.3-1.5):(2.0-3.0) of the potassium isobutanol to the xylene and furtherly reducing a temperature to 0-5° C.;
3) adding 3-methyl-3-hydroxybutyne and M into a system of step 2) with a mole ratio of the 3-methyl-3-hydroxybutyne, the M and the xylene being 1:(1.2-1.3):(2.0-3.0), then carrying out a second reaction under 40-50° C. for 3 hours, finally obtaining octynylenediol through a series of processes of a cooling crystallization, a centrifugal separation and a drying;
4) mixing the octynylenediol, alcohol and a Pd catalyst in a weight ratio of (2-3):10:(0.01-0.03), then carrying out a third reaction accompanied with a continuous hydrogen input at 40-50° C. for 50-60 minutes, finally obtaining the tert-butyl branched diol through a series of processes of a separation and a purification;
wherein R is —H, —CH$_2$CH$_3$, —CH(CH$_3$)$_2$ or —C(CH$_3$)$_3$, accordingly the M refers to 2,2-dimethylpropanal, 2,2-dimethyl-3-pentanone, 2,2,4-trimethyl-3-pentanone or 2,2,4,4-tetramethyl-3-pentanone, respectively.

12. The cationic dyeable polyester fiber of claim 11, wherein a calcining time of the solid heteropolyacid is 2-4 hours, and a content of TiO$_2$, ZrO$_2$, Al$_2$O$_3$, ZnO and CaO in SiO$_2$—TiO$_2$, SiO$_2$—ZrO$_2$, B$_2$O$_3$—Al$_2$O$_3$, TiO$_2$—ZnO and SiO$_2$—CaO are 30-50 wt %, 30-50 wt %, 20-40 wt %, 20-40 wt % and 20-50 wt %, respectively, and in addition, after calcining the solid heteropolyacid, the solid heteropolyacid is ground into fine powders with an average diameter less than 0.5 micron.

13. The cationic dyeable polyester fiber of claim 12, wherein the cationic modified polyester is manufactured through the following steps:

1) the esterification reaction as follows:
concocting the PTA, the EG, the SIPE and the tert-butyl branched diol into a slurry, then adding in the high temperature calcined solid heteropolyacid powder, the Pd catalyst, a matting agent and a stabilizer and carrying out the esterification reaction in a nitrogen atmosphere with a pressure of 101.325 kPa 0.3 MPa at 240-250° C., finally ending the esterification reaction when a water distillation reaching more than 90% of a theoretical value;
2) the polycondensation reaction as follows:
smoothly reducing a pressure of the system of step (1) to less than 500 Pa within 30-50 minutes and carrying out the polycondensation reaction at 250-260° C. for 30-50 minutes, successively, further reducing the pressure to less than 100 Pa and continuing the polycondensation reaction at 270-275° C. for 50-90 minutes.

14. The cationic dyeable polyester fiber of claim 13, wherein a molar ratio of the PTA, the EG and the tert-butyl branched diol is 1:(1.2-2.0):(0.03-0.05), and a dosage of the SIPE is 1.2-1.6 mol % relative to an amount of the PTA, an amount of the SIPE is due to an incorporation of the tert-butyl branched diol to enhance dyeing performance of the cationic modified polyester, and additions of the solid heteropolyacid, the Pd catalyst, the matting agent and the stabilizer respecting to the PTA are 0.03-0.05 wt %, 0.03-0.05 wt %, 0.20-0.25 wt % and 0.01-0.05 wt %, respectively.

15. The cationic dyeable polyester fiber of claim 14, wherein the Pd catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

16. The cationic dyeable polyester fiber of claim 15, wherein the cationic modified polyester has a molecular weight of 24000-28000 and a molecular weight distribution index of 1.9-2.4.

17. The cationic dyeable polyester fiber of claim 9, wherein an FDY technique comprises the steps of metering, spinneret extruding, cooling, oiling, stretching, heat setting and winding;
wherein an FDY process involves technological parameters of a spinning temperature of 270-280° C., a cooling temperature of 18-20° C., an interlacing pressure of 0.20-0.30 MPa, godet roller 1 speed of 2200-2600 m/min, godet roller 1 temperature of 75-90° C., godet roller 2 speed of 3600-3900 m/min, godet roller 2 temperature of 105-120° C., and a winding speed of 3560-3850 m/min.

* * * * *